United States Patent [19]

Maxemchuk et al.

[11] 4,141,035

[45] Feb. 20, 1979

[54] TECHNIQUE FOR SEPARATING COMPOSITE VIDEO SIGNALS

[75] Inventors: Nicholas F. Maxemchuk, Mercerville; Dhiraj K. Sharma, Matawan, both of N.J.

[73] Assignee: Bell Telephone Laboratories, Incorporated, Murray Hill, N.J.

[21] Appl. No.: 843,983

[22] Filed: Oct. 20, 1977

[51] Int. Cl.$^2$ .................................. H04N 9/535
[52] U.S. Cl. ................................... 358/31
[58] Field of Search .................. 358/31, 138, 13

[56] References Cited

U.S. PATENT DOCUMENTS

4,050,084  9/1977  Rossi ........................... 358/31

Primary Examiner—John C. Martin
Attorney, Agent, or Firm—Barry H. Freedman

[57] ABSTRACT

A composite video signal is separated into luminance and chrominance components by forming at least two estimates of the value of each component, based upon at least two sets of samples of the signal, and by selecting the best estimate based upon local picture characteristics. In one embodiment, the first estimate is derived from samples associated with picture elements which lie along the same scan line as the element then being processed, while the second estimate is derived from samples associated with picture elements in different lines above and below the present line. The best estimate selection is based on the relationship between each estimate and the component values of neighboring picture elements. If desired, delayed separation can be used to determine the effect of each estimate on future separations, before a selection is made.

18 Claims, 11 Drawing Figures

TECHNIQUE FOR SEPARATING COMPOSITE VIDEO SIGNALS

BACKGROUND OF THE INVENTION

1) Field of the Invention

The present invention pertains generally to processing of color video signals and, in particular, to the separation of composite video signals into luminance and chrominance components.

2) Description of the Prior Art

Various techniques have been devised to increase the efficiency with which color video signals are encoded, and many such systems utilize the interrelationship between the chrominance and luminance components of the signal to achieve the desired bit rate reduction. Example of such techniques are contained in patent applications Ser. No. 826,025 and No. 826,057 filed by A. N. Netravali and C. B. Rubinstein on Aug. 19, 1977, and assigned to the same assignee as the present invention. Accordingly, the ability to effectively separate a composite video signal into chrominance and luminance components is quite important.

In prior art arrangements, separations are normally achieved with comb filters and low pass filters, as illustrated, for example, in U.S. Pat. No. 4,003,079, issued to N. Y. Woo on Jan. 11, 1977. These filters are generally "non-adaptive", and treat all areas of the picture in the same way. This leads to inaccuracies in the separation, particularly near edges in the picture, where local characteristics differ significantly from average characteristics. Further, where digital processing is involved, such filtering is accomplished by digital filters which perform a relatively large number of multiplications by general coefficients. These multipliers must be implemented by using extremely fast RAM's, thus adding to system complexity and cost.

In view of the foregoing, it is the broad object of the present invention to improve the efficiency of color signal separation by taking local picture characteristics into account. In addition, it is desired to simplify the filters used in making the separations to reduce their complexity and cost.

SUMMARY OF THE INVENTION

The foregoing and additional objects are achieved in accordance with the present invention by a separation technique wherein at least two independent estimates of the luminance and chrominance components are derived from at least two different picture directions, by using two different digital filters. The best estimate is then chosen depending upon the local picture characteristics. The first estimate may be derived from picture elements which lie along the same scan line as the element then being processed, while the second estimate may be derived from picture elements on different lines above and below the present line. Each estimate is evaluated by comparing the individual component values with the component values of neighboring elements; for example, the difference between the estimated component values for a given element can be compared with the component values of neighboring elements to select the estimate which yields the smallest difference. Alternatively, a delayed separation technique can be used, wherein all of the possible separated component values at one or more succeeding picture elements are examined for every combination of preceding picture element component values, and a determination made as to which combination will produce the best result.

The different estimates of the component signals at each picture element are generated, in accordance with the present invention, by "short" filters which extend from the element being processed in different directions, such as the horizontal and vertical directions. The filters are designed by fitting polynomials in the appropriate direction to the luminance and chrominance signals. Advantageously, the coefficients in the filters assume values generally of the form $(\frac{1}{2})^i$, which is easily implemented by a small number of adders.

The present invention has been found to provide improved separation, and works well even in areas of the picture where one or more of the components change rapidly. The performance in flat picture areas is also satisfactory. Furthermore, as stated previously, the separation filters are easily implemented, and do not require high speed RAMs.

BRIEF DESCRIPTION OF THE DRAWING

The foregoing and other advantages of the present invention will be more fully appreciated from the following detailed description, when read in light of the accompanying drawing in which.

DETAILED DESCRIPTION

In the following description, it is assumed that an NTSC television signal is sampled (by conventional means) at a rate four times that of the color subcarrier frequency, and that the phases of the sampling signal and the color subcarrier are suitably matched. Thus, alternate samples contain information relating to the two chrominance components $C_1$ and $C_2$. For this sampling frequency, 910 samples are made for each scan line of picture information.

Figure 1:
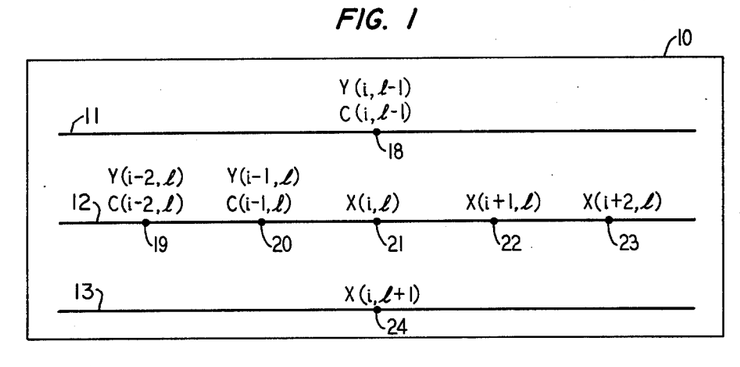
FIG. 1 illustrates the locations of elements in a picture whose composite video signal is being separated, and the nomenclature associated with the luminance and chrominance values associated with the various elements.

The terminology to be used hereinafter is illustrated in FIG. 1. In that figure, a picture 10 is scanned along a plurality of generally parallel scan lines, such as lines 11, 12, 13. The signal output from the scanning apparatus is sampled (at a rate generally set at four times the color subcarrier frequency) and each sample is uniquely associated with a particular element of the picture. The picture elements are located in accordance with a rectangular coordinate system. Thus, the picture element presently being processed will be said to lie on the $l^{th}$ line at the $i^{th}$ sample position; the composite value of the video signal for this element (for example, element 21 on line 12) will be denoted X(i,l). Similarly, the composite values of the video signal for succeeding picture elements 22 and 23 which on the same line 12 are X(i+1,l) and X(i+2,l), respectively. Sample 24, which lies on the succeeding line 13 directly below element 21, has a composite value given by X(i,l+1).

For picture elements on the presently processed line 12 that precede element 21, the composite signal X will be separated into luminance and chrominance components Y and C, respectively, by the apparatus of the present invention. Thus, element 20 which immediately precedes element 21 on line 12 has luminance and chrominance components Y(i−1,l), and C(i−1,l), respectively; element 19 which precedes the present element 21 by two sample intervals has component values Y(i−2,l) and C(i−2,l). On the preceding line 11, element 18 (immediately above the present element 21) has component values given by Y(i,l−1) and C(i,l−1).

As stated previously, the present invention is intended to separate X(i,l) into its luminance and chrominance components Y(i,l) and C(i,l), respectively. Broadly speaking, this is accomplished by forming at least two estimates of these components based upon the values of at least two different sets of elements surrounding the present element, and by choosing the "best" estimate. Once Y(i,l) and C(i,l) have been found, the values for I and Q are computed conventionally, as follows:

$$I(i,l) = (-1)^l \cos(i\pi/2) \, C(i,l) \text{ for i even, and} \quad (1)$$

$$Q(i,l) = (-1)^l \sin(i\pi/2) \, C(i,l) \text{ for i odd.} \quad (2)$$

For convenience in the ensuing description, the first set of picture elements can include those elements (19–23) before and after the present element on the same scan line. The second set of picture elements can include those elements (18, 21, 24) above and below the present element, i.e., elements which correspond to samples offset with respect to the present sample, by integral numbers line scan intervals. The first estimate can thus be referred to as a horizontal estimate, while the second can be referred to as a vertical estimate. It is to be understood that other sets of picture elements can be used.

In accordance with the invention, the luminance and chrominance components are assumed to be represented by first order polynomials in the formation of the vertical estimates, which are denoted $Y_V$ and $C_V$. Thus $$Y_V(i,l+k) = Y_0 + Y_1 K \quad \text{and} \quad (3)$$

$$C_V(i,l+k) = (c_0 + c_1 k)(-1)^K, \quad (4)$$

where K is a measure of the displacement of a picture element from the X(i,l) element. Equations (3) and (4) lead to the set of equations:

$$\begin{bmatrix} 1 & -1 & 1 & 0 \\ 0 & 0 & -1 & 1 \\ 1 & 0 & 1 & 0 \\ 1 & 1 & -1 & -1 \end{bmatrix} \begin{bmatrix} Y_0 \\ Y_1 \\ C_0 \\ C_1 \end{bmatrix} = \begin{bmatrix} Y(i,l-1) \\ C(i,l-1) \\ X(i,l) \\ X(i,l+1) \end{bmatrix} \quad (5)$$

which have a solution:

$$\begin{bmatrix} Y_V(i,l) \\ C_V(i,l) \end{bmatrix} = \begin{bmatrix} \frac{1}{4} & \frac{1}{4} & \frac{1}{2} & \frac{1}{4} \\ -\frac{1}{4} & -\frac{1}{4} & \frac{1}{2} & -\frac{1}{4} \end{bmatrix} \begin{bmatrix} Y(i,l-1) \\ C(i,l-1) \\ X(i,l) \\ X(i,l+1) \end{bmatrix} \quad (6)$$

With respect to the horizontal estimates, the luminance component $Y_H$ is assumed to be represented by a second order polynomial. Successive chrominance components are assumed to be different signals ($C_1$ and $C_2$), the $(i-2)^{th}$, $i^{th}$ and $(i+2)^{th}$ being $C_1$, and the $(i-1)^{th}$ and $(i+1)^{th}$ being $C_2$. Each chrominance component is assumed to be a first order polynomial. The representations are thus:

$$Y(i+k,l) = Y_A + Y_B K + Y_C K^2 \quad (7)$$

$$C_1(i+k,l) = (c_a + c_b k)(-1)^K \quad (8)$$

$$C_2(i+k,l) = (c_c + c_d k)(-1)^K \quad (9)$$

This leads to the set of equations:

$$\begin{bmatrix} 1 & -2 & 4 & 0 & 0 & 0 & 0 \\ 0 & 0 & 0 & -1 & 1 & 0 & 0 \\ 1 & -1 & 1 & 0 & 0 & 0 & 0 \\ 0 & 0 & 0 & 0 & 0 & -1 & 1 \\ 1 & 0 & 0 & 1 & 0 & 0 & 0 \\ 1 & 1 & 1 & 0 & 0 & 1 & 1 \\ 1 & 2 & 4 & -1 & -1 & 0 & 0 \end{bmatrix} \begin{bmatrix} Y_A \\ Y_B \\ Y_C \\ C_A \\ C_B \\ C_C \\ C_D \end{bmatrix} = \begin{bmatrix} Y(i-2,l) \\ C(i-2,l) \\ Y(i-1,l) \\ C(i-1,l) \\ X(i,l) \\ X(i+1,l) \\ X(i+2,l) \end{bmatrix} \quad (10)$$

and the solution, $$\begin{bmatrix} Y_H(i,l) \\ C_H(i,l) \end{bmatrix} = \begin{bmatrix} -\frac{3}{8} & -\frac{1}{8} & -1 & \frac{3}{4} & -\frac{1}{8} \end{bmatrix} \begin{bmatrix} Y(i-2,l) \\ C(i-2,l) \\ Y(i-1,l) \\ X(i,l) \\ X(i+2,l) \end{bmatrix} \quad (11)$$

The estimates described above are computed in a vertical filter 202 and a horizontal filter 203 shown in block diagram form in FIG. 2, and described in detail hereinafter. These filters can be denominated "spatial filters" since they operate on particular samples based upon the location of picture elements with which the samples are associated. Some inputs to the filters are derived from a delay circuit 201, also described below; the remaining filter inputs are derived from a decision circuit 204 (also described hereinafter), which produces the best prediction that is desired.

Figure 3:
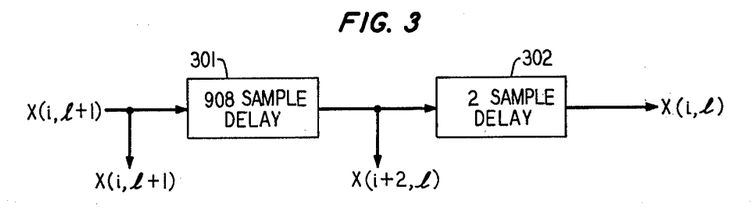
FIG. 3 is a block diagram of delay circuit 201 of FIG. 2.

Delay circuit 201 is shown in detail in FIG. 3. The purpose of this circuit is to simultaneously provide the values of samples 21, 23 and 24 to filters 202 and 203; the values of these samples are X(i,l), X(i+2,l) and X(i,l+1). Assuming that each scan line includes 910 samples, the delay circuit may include a first delay element 301 having a delay of 908 samples, and a second delay element 302 having a 2-sample delay connected in series with the first element. When the input to element 301 is X(i,l+1), i.e., sample 24, the output of element 301 is X(i+2,l), i.e., sample 23, while the output of element 302 is X(i,l), i.e., sample 21. X(i,l) is coupled to vertical filter 202 on line 220 and to horizontal filter 203 on line 221. X(i,l+1) is coupled to filter 202 on line 222, while X(i+2,l) is coupled to filter 203 on line 223.

Figure 4:
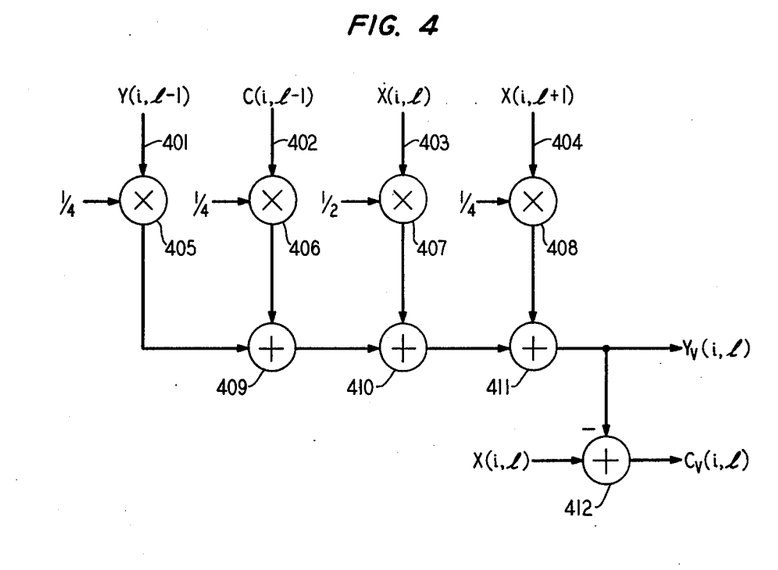
FIG. 4 is a block diagram of vertical filter 202 of FIG. 2.

A vertical filter 202 which solves Equation (6) is shown in detail in FIG. 4. The filter has four inputs 401–404, each connected to an input of a corresponding multiplier 405–408. Input 403 receives the value X(i,l) from the output of delay element 302 of FIG. 3. Input 404 receives the value X(i,l+1) from the input of delay element 301. Inputs 401 and 402 receive the luminance and chrominance values of the $i^{th}$ sample on the previous $(l-1)^{th}$ line from decision circuit 204, via connections 205 and 206, respectively, of FIG. 2.

In accordance with Equation (6), multipliers 405, 406 and 408 each have multiplication coefficients of $\frac{1}{4}$, while multiplier 407 has a coefficient of $\frac{1}{2}$. Since these coefficients are powers of $\frac{1}{2}$, the multiplications are readily performed by displacing or shifting the wires with the binary representation of the multiplicand before they are combined with each other in a series of adders 409–411, so that the output of the last adder (411) is the vertical luminance estimate $Y_V(i,l)$ as defined in Equation (6). An additional algebraic adder 412 is provided in the filter of FIG. 4 to form the difference between X(i,l) and the luminance estimate $Y_V(i,l)$. Inspection of Equation (6) reveals that this difference equals the vertical chrominance estimate $C_V(i,l)$. Both estimates are coupled to the decision circuit 204 via leads 207 and 208.

Figure 5:
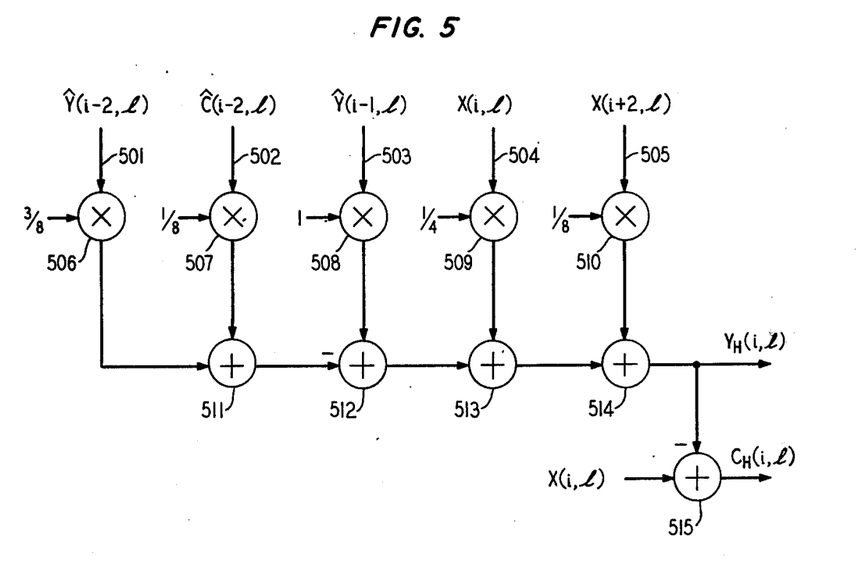
FIG. 5 is a block diagram of horizontal filter 203 of FIG. 2.

A horizontal filter 203 which solves Equation (11) is shown in detail in FIG. 5. The filter has five inputs 501–505, each connected to an input of a corresponding multiplier 506–510. Input 504 receives the value X(i,l) from the output of delay element 302 of FIG. 3, while input 505 receives the value X(i+2,l) from the output of delay element 301. Inputs 501 and 502 are the luminance and chrominance values, respectively, of the $(i-2)^{th}$ element on the $l^{th}$ line; these values are designated $\hat{Y}(i-2,l)$ and $\hat{C}(i-2,l)$, with the hat " ˆ " indicating that the values are tentative, in the case of delayed separation discussed below. Input 503 is the luminance value of the $(i-1)^{th}$ element on the $l^{th}$ line. The three last mentioned inputs (501, 502 and 503) are derived from decision circuit 204 via connections 209, 210 and 211, respectively, of FIG. 2.

In accordance with Equation (11), multipliers 507 and 510 have coefficients of $\frac{1}{4}$, multiplier 509 has a coefficient of $\frac{1}{2}$, multiplier 506 has a coefficient of $\frac{3}{8}$ and the coefficient of multiplier 508 (needed only for parallelism) is unity. The outputs of the multipliers are algebraically combined in a series of adders 511–514, which add the outputs of multipliers 508–510 and subtract, from the sum, the outputs of multipliers 506 and 507. The output of the last adder (514) is the horizontal luminance estimate $Y_H(i,l)$, as defined in Equation (11). An additional algebraic adder 515 is provided in the filter of FIG. 5 to form the difference between X(i,l) and the luminance estimate $Y_H(i,l)$. Inspection of Equation (11) reveals that this difference equals the horizontal chrominance estimate $C_H(i,l)$. Both estimates are coupled to the decision circuit 204 via leads 207 and 208.

Figure 6:
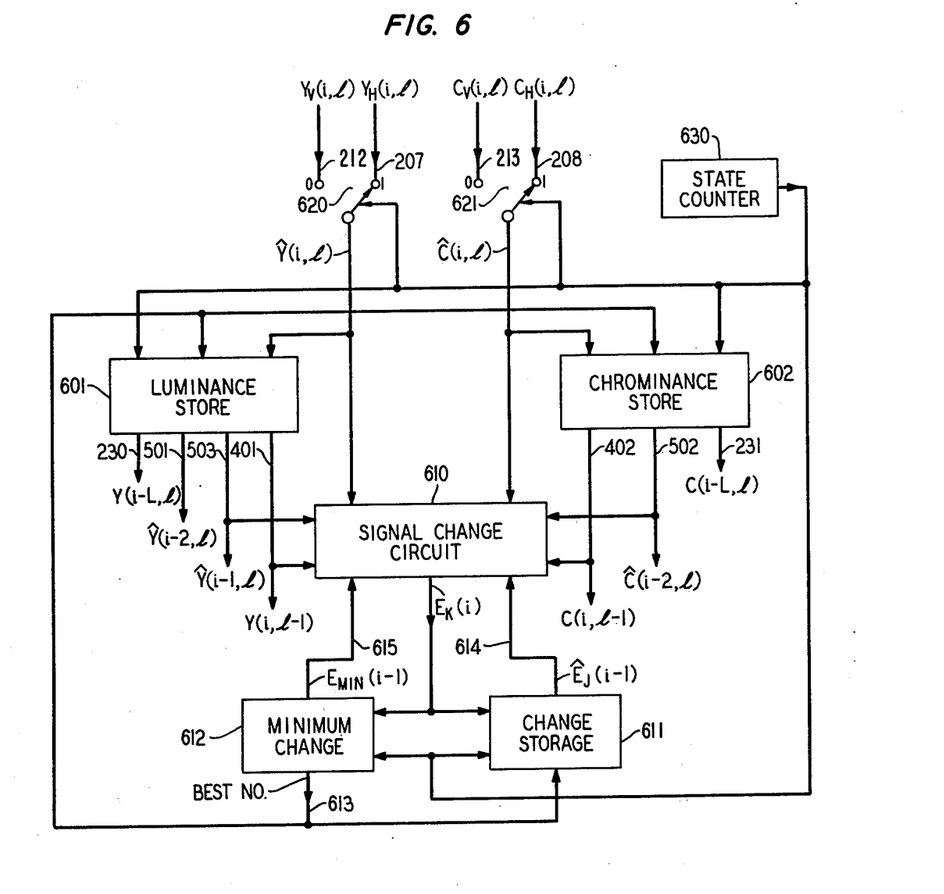
FIG. 6 is a block diagram of decision circuit 204 of FIG. 2.

An overall block diagram of decision circuit 204 is shown in FIG. 6. The purpose of this circuit is, as stated previously, to determine which of the luminance and chrominance estimates are "best". This determination can be made simply by comparing the differences between the vertical and horizontal predictions of each component and the component values of picture elements "near" the element being processed; in this context, "near" or neighboring elements will be assumed, for the sake of simplicity, to comprise (a) for luminance predictions, the element immediately preceding the element being processed, and the element immediately above the element being processed, and (b) for chrominance predictions, the element preceding the present element by two sample intervals and the element immediately above the element being processed. However, it is to be understood that other definitions of "near" may also be used, and that the relationship between the estimated values and the neighboring values that controls the decision circuit is not limited to a simple algebraic difference but may depend on a square of differences, or other desired functions.

Having determined which predictions are "best", the selected luminance and chrominance values may be immediately output from the decision circuit of FIG. 6. However, it has been found advantageous to make a *tentative* decision, and to then evaluate succeeding predictions based upon various combinations of the prior values in the same line before finalizing the decision. This approach, referred to before as a delayed separation, can be carried to several delay levels, each level requiring a delay of one sample interval. Accordingly, the outputs of the decision circuit of FIG. 6 are denoted Y(i−1,l) and C(i−L,l), wherein L is an integer indicating the number of samples' delay being used. For L=0 (no delay), a decision is made between two choices, i.e., the outputs of the horizontal and vertical filters. For L=1, (one sample delay) four choices are available, i.e., two choices for the present sample combined with two choices for the previous sample. For L=2, (two sample delay) eight choices exist, i.e., the $i-2^{th}$ sample can have two possible values, the $i-1^{th}$ sample can have four possible values, and the $i^{th}$ sample can have eight values. In general, the number of possible variations is given by $2^{L+1}$.

Figure 2:
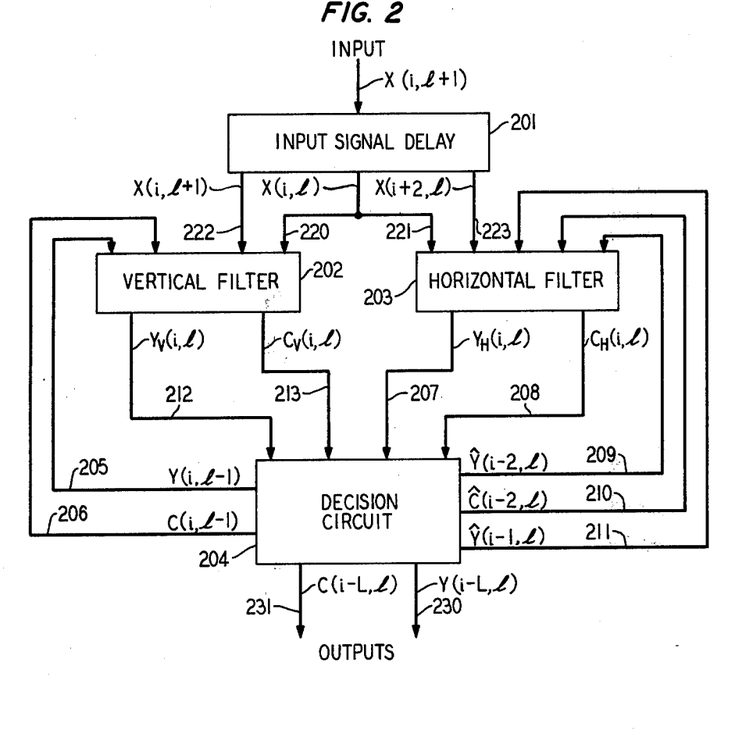
FIG. 2 is an overall block diagram of separation apparatus constructed in accordance with the present invention.

In FIG. 6, which is configured for the general case of an L sample delay, the inputs to the decision circuit are the horizontal and vertical luminance estimates from outputs 207 and 212 of FIG. 2, and the horizontal and vertical chrominance estimates from outputs 208 and 213 of FIG. 2. The outputs are Y(i−L,l) and C(i−L,l), which are denoted 230 and 231 in FIG. 2, respectively.

The luminance estimates $Y_V(i,l)$ and $Y_H(i,l)$ are coupled to a luminance store 601 and a signal change circuit 610 (both to be described hereinafter), depending upon the position of a first sequence switch 620. Similarly, one or the other of the chrominance estimates $C_V(i,l)$ and $C_H(i,l)$ are coupled to a chrominance store 602 and to change circuit 610, depending upon the position of a second sequence switch 621. Switches 620 and 621 are controlled by the low order bit output from a state counter 630, which provides a binary count described hereinafter. The switches thus alternate, in unison, between the positions shown.

State counter 630 may be implemented as a binary counter arranged to count from 0 to $2^{L+1}$. Thus, for L = 2, the outputs of the counter would be 000, 001, 010, 011,...111. A complete counting cycle occurs during each sampling interval of the signal being separated, and suitable synchronization between the composite video signal and counter 630 is achieved in various ways well known to those skilled in the art.

Returning to FIG. 6, luminance store 601 and chrominance store 602 serve to accumulate luminance and chrominance values of previous samples, and include delay elements and registers to be described hereinafter. Both stores receive inputs from state counter 630 for timing purposes. Luminance store 601 provides, in addition to separated luminance value $\hat{Y}(i-L,l)$ on output 230, the values $\hat{Y}(i-2,l)$ $\hat{Y}(i-1,l)$ and $\hat{Y}(i,l-1)$ needed by the filters of FIGS. 4 and 5 on lines 501, 503 and 401, respectively. In addition, the luminance values of the neighboring elements ($\hat{Y}(i,l-1)$ and $\hat{Y}(i-1,l)$) are coupled from store 601 to change circuit 610. In similar fashion, chrominance store 602 provides, in addition to separated chrominance value $\hat{C}(i-L,l)$ on output 231, the values $\hat{C}(i-2,l)$ and $\hat{C}(i,l-1)$ needed by the filters of FIGS. 4 and 5 on lines 502 and 402, respectively. In addition, the chrominance values of the neighboring elements ($\hat{C}(i,l-1)$ and $\hat{C}(i-2,l)$) are coupled from store 602 to change circuit 610. It is to be noted here that the chrominance value of the "preceding" element is considered to be $C(i-2,l)$, not $C(i-1,l)$, since it was assumed earlier that alternate samples of the composite signal $X(t)$ contain $C_1$ and $C_2$ information.

Signal change circuit 610, described more fully hereinafter, is designed to compute the difference between each estimate of the luminance and chrominance values of the picture element being processsed, and its neighbors, as defined previously. The output of circuit 610 is designated the change or error value $E_K(i)$, where K is the state number from counter 630. This output is coupled to a change storage circuit 611 and to a minimum change circuit 612. Storage circuit 611 is required, since each estimate of the luminance and chrominance components is compared to the neighboring element's value sequentially, and the result of one computation must be stored during the other computations; furthermore, in delayed separations, the neighboring element's values may themselves not be final, so that a plurality of change values need to be stored. Change storage circuit 611 also provides an output 614 to change circuit 610 which indicates the previous error value $E_J(i-1)$ which is added to the present error value to compute $E_K(i)$. Minimum change circuit 612 keeps a running tally, as described hereinafter, of the error values output from change circuit 610, in order to determine which estimate produced the smallest change or error. The output 613 of circuit 612 is denominated the "best number" corresponding to the estimate producing the smallest change, and this output, which is a binary number between 0 and $2^{L+1} - 1$, is coupled to storage circuits 601, 602 and 611. Change circuit 612 also transmits to change circuit 610 on output 615 the minimum error value $E_{min}(i-1)$ computed for the preceding sample; this is done so that in delayed separations, long chains or errors are "normalized" by subtracting a minimum error value, thus avoiding unnecessary overloads. Both circuits 611 and 612 receive timing signals from state counter 630.

The construction of luminance store 601 and chrominance store 602 depends upon the level L of delay used in the separation apparatus of the present invention. Obviously, better results can be achieved by delaying the separation decision for several sample intervals, so that all combinations of tentative separations can be examined to determine which pattern is best; however, each increase in the amount of delay brings about an increase in complexity and cost, since the amount of storage rises generally as a function of $2^L$. For the purposes of explanation, stores 601 and 602 will be described first where no delay is used (L = 0), and then for the case where the sample delay is L = 2.

Figure 7:
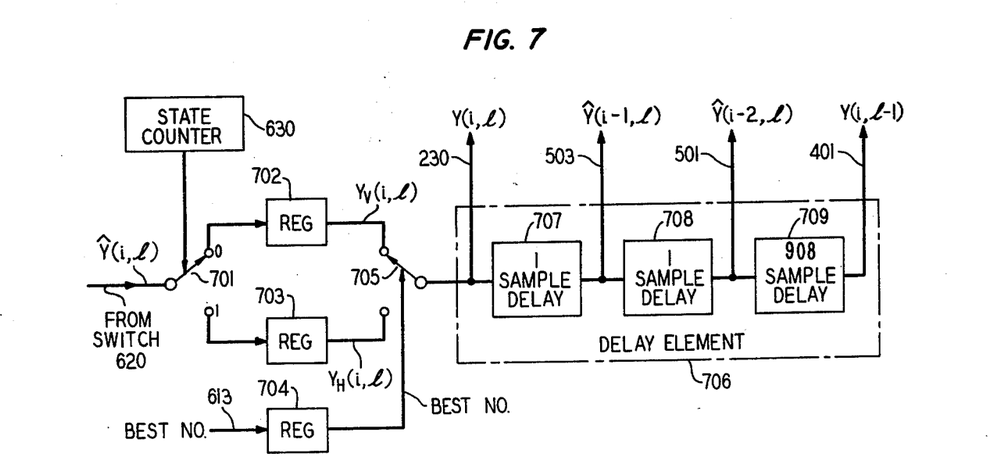
FIG. 7 is a block diagram of luminance storage circuit 601 of FIG. 6, when delayed separations are not used.

In FIG. 7, a luminance store for L = 0 is shown. The store receives its input, denominated $\hat{Y}(i,l)$, from switch 620 of FIG. 6, which as stated previously, has the value $Y_V(i,l)$ when the low order bit output fom state counter 630 is a "0" and the value $Y_H(i,l)$ when the low order bit is a "1". This input is applied via a switch 701 to a first register 702 or a second register 703; the position of switch 701, like that of switch 620, is controlled by the low order bit output from state counter 630, so that register 702 stores $Y_V(i,l)$ at state "0" and register 703 stores $Y_H(i,l)$ at state "1". During state 2, the best estimated luminance value is read out from registers 702 or 703. This is accomplished by storing the "best number" output from minimum change circuit 612 on line 613 in a register 704, and by controlling the position of a selection switch 705 in accordance with the stored value, during state 2. As shown in FIG. 7, switch 705 is positioned to couple the value $Y_V(i,l)$ through switch 705 to a delay circuit 706; this presumes that the vertical estimate was the best in this example.

Delay element 706 includes a pair of series connected one sample delay circuits 707 and 708 followed by a 908 sample delay circuit 709. The input to element 706 is the desired filter output $\hat{Y}(i-L,l)$, corresponding to output 230 of FIG. 2. (In this example, L = 0, so $\hat{Y}(i-L,l)$ = $\hat{Y}(i,l)$.) The output from circuit 707 is $\hat{Y}(i-1,l)$, corresponding to output 503 of FIG. 2, while the outputs from circuits 708 and 709 are $\hat{Y}(i-2,l)$ and $\hat{Y}(i,l-1)$, corresponding to outputs 501 and 401 of FIG. 6, respectively.

While chrominance store 602 is not shown separately, it may be constructed in a manner identical to that of the luminance store of FIG. 7.

Figure 8:
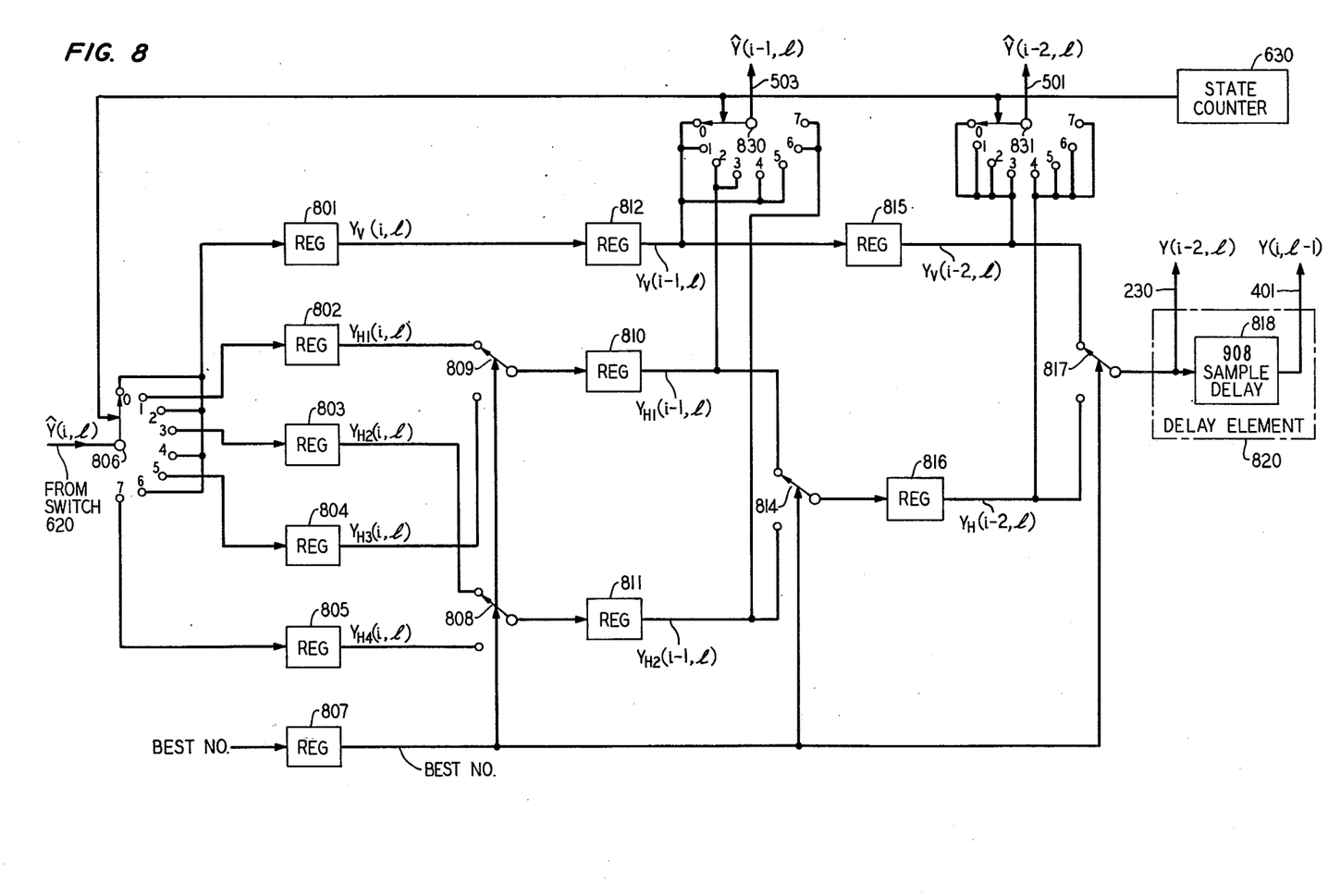
FIG. 8 is a block diagram of luminance storage circuit 601 when delayed separations are employed.

In the case where L = 2, the luminance store may be constructed as shown in FIG. 8. Generally speaking, the luminance store includes a series of registers 801–805, 810–812, 815 and 816 which are each designed to store one estimated luminance value. The registers are arranged in stages or tiers that are interconnected in a tree type arrangement. Specifically, with respect to horizontal filter estimates, the first tier includes registers 802–805, the second tier includes registers 810–811, and the third tier includes register 816; for vertical estimates, the first, second and third tiers include registers 801, 812 and 815, respectively.

The registers 802–805 in the first tier are interconnected to registers 810 and 811 in the second tier via a pair of switches 808 and 809, the positions of which are controlled by the "best number" output from minimum change circuit 612 and stored in another register 807. Similarly, the second tier registers are interconnected with register 816 in the third tier by switch 814, also being controlled by the contents of register 807. Also, the third tier registers 815 and 816 are connected to a delay element 820 via a switch 817 under the control of the stored "best number". Registers 810, 812 and 815 are serially interconnected.

Registers 801–805 in the first tier receive, in a manner described below, the tentative values for $Y_V(i,l)$ and $Y_H(i,l)$, based upon various combinations of values of prior samples. Similarly, registers 810-812 in the second tier receive the tentative values for $Y_V(i-1,l)$ and $Y_H(i-1,l)$, based upon various combinations of prior values. The second tier has three registers because the prior sample $Y(i-2,l)$ may have one of two possible values (namely a vertical filter value and a horizontal filter value) and each of these two values may, in turn, result in two values for $\hat{Y}(i-1,l)$ (namely a vertical filter value and a horizontal filter value). Accordingly, a total of *four* values of $\hat{Y}(i-1,l)$ are possible. However, both of the vertical filter outputs are identical, so that the results may be stored in *three* registers 810-812 as shown in FIG. 8. The first tier has five registers because each of the four possible values of $\hat{Y}(i-1,l)$ give rise to a vertical and horizontal filter value for $\hat{Y}(i,l)$, thus totaling *eight* possible values; however, all four of the vertical filter values are identical, so that the results may be stored in *five* registers 801-805. These values are denominated $Y_V(i,l)$ and $Y_{H1}(i,l)-Y_{H4}(i,l)$; the inputs used to calculate $Y_{H1}-Y_{H4}$ are set out in the following Table I:

TABLE I

| OUTPUT | INPUTS | | |
|---|---|---|---|
| | $\hat{Y}(i-1,l)$ | $\hat{Y}(i-2,l)$ | $\hat{C}(i-2,l)$ |
| $Y_{H1}(i,l)$ | $Y_V(i-1,l)$ | $Y_V(i-2,l)$ | $C_V(i-2,l)$ |
| $Y_{H2}(i,l)$ | $Y_{H1}(i-1,l)$ | $Y_V(i-2,l)$ | $C_V(i-2,l)$ |
| $Y_{H3}(i,l)$ | $Y_V(i-1,l)$ | $Y_H(i-2,l)$ | $C_H(i-2,l)$ |
| $Y_{H4}(i,l)$ | $Y_{H2}(i-1,l)$ | $Y_H(i-2,l)$ | $C_H(i-2,l)$ |

At the end of each sample interval, the contents of the registers are shifted such that registers 801-805 are filled with new values, while the stored values from certain registers in the first tier are shifted to registers 810-812 of the second tier. The value stored in register 812 is denominated $Y_V(i-1,l)$, while the values stored in registers 810 and 811 are denominated $Y_{H1}(i-1,l)$ and $Y_{H2}(i-1,l)$, respectively. In like manner, at the end of each sample interval, registers 810-812 are filled with new values, while the stored values from certain registers in the second tier are shifted to registers 815 and 816 of the third tier. The value stored in register 815 is denominated $Y_V(i-2,l)$, while the value in register 816 is denominated $Y_H(i-2,l)$. Concurrently, switch 817 couples either $Y_V(i-2,l)$ or $Y_H(i-2,l)$ to a delay circuit 820.

The shifting procedure described above is best understood by considering the operation of the circuit at a given time when the $X(i,l)$ sample is being processed. At that time, a decision is made for the $(i-2)^{th}$ sample, when switch 817 selects either $Y_V(i-2,l)$ or $Y_H(i-2,l)$. Concurrently, subsequent estimates which utilized the non-selected value may be discarded. For example, if $Y_V(i-2,l)$ is selected for $\hat{Y}(i-2,l)$, then, from the preceding table, the value $Y_{H2}(i-1,l)$ may be discarded since it was based upon a now incorrect assumption that $\hat{Y}(i-2,l) = Y_H(i-2,l)$. Thus, switch 814 will couple $Y_{H1}(i-1,l)$ from register 810 to register 816. If $Y_H(i-2,l)$ is selected, the reverse is true, so that the positions of switches 817 and 814 are controlled in unison.

With $Y_{H2}(i-1,l)$ discarded, inspection of Table I also indicates that $Y_{H3}(i,l)$ and $Y_{H4}(i,l)$ may be discarded, since both of these values were calculated by assuming that $\hat{Y}(i-2,l) = Y_H(i-2,l)$. This is accomplished when switch 808 couples $Y_{H2}(i,l)$ from register 803 to register 811 and switch 809 coupled $Y_{H1}(i,l)$ from register 802 to register 810, these being the retained values. Switches 808 and 809 thus operate in unison with each other and with switches 814 and 817.

When the state of state counter 630 is between 0 and 7, the different values from $\hat{Y}(i,l)$ are calculated by the filters of FIGS. 4 and 5, and the filter outputs are entered into the appropriate registers 801-805 of the first tier by appropriate positioning of a multiposition switch 806. Specifically, during states 0, 2, 4 and 6, switch 806 is connected to a single register 801, since the value of the vertical element $Y_V(i,l)$ does not depend on the values of previous samples in the same line (see Equation 6). During states 1, 3, 5 and 7, switch 806 is arranged to enter $Y_{H1}(i,l)-Y_{H4}(i,l)$ into registers 802-805, respectively. Also, during states 0-7, the change values are calculated for each of the filter outputs using the values of $\hat{Y}(i,l)$ and $\hat{C}(i-2,l)$ dictated by luminance and chrominance store switches 830 and 831. Specifically, during states 0, 1, 2 and 3, switch 831 sets $\hat{Y}(i-2,l)$ to $Y_V(i-2,l)$ by connecting register 815 to line 501. During states 4, 5, 6 and 7, switch 831 sets $\hat{Y}(i-2,l)$ to $Y_H(i-2,l)$ by connecting register 816 to line 501. During states 0, 1, 4, 5, switch 830 sets $\hat{Y}(i-1,l)$ to $Y_V(i-1,l)$ by connecting register 812 to line 503. During states 2 and 3, $\hat{Y}(i-1,l) = Y_{H1}(i-1,l)$ and during states 6 and 7, $\hat{Y}(i-1,l) = Y_{H2}(i-1,l)$. Lines 501 and 503 thus provide the correct inputs to the filters of FIGS. 4 and 5 and to the signal change circuit of FIG. 9. After the calculation of the various $\hat{Y}(i,l)$ values and the corresponding change calculations, switches 808, 809 and 814 which, as stated previously, are controlled in unison by the value stored in register 807, determine which of the stored luminance values are saved. In addition, switch 817 selects the value $Y(i-L,l)$ (in this example, $Y(i-2,l)$) determined to be the best estimate of the luminance signal, and applies it to delay element 820 which, in this example, comprises a delay circuit 818 having a 908 sample delay. The output of circuit 818 is the value $Y(i,l-1)$ on line 401.

Chrominance store 602 again may be constructed in a manner identical to that just described for luminance store 601.

Figure 9:
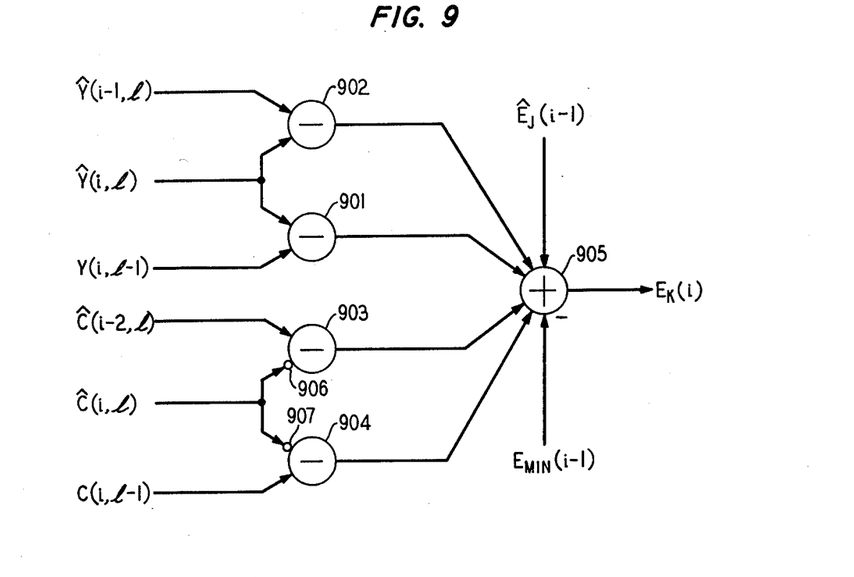
FIG. 9 is a block diagram of signal change circuit 610 of FIG. 6.

Signal change circuit 610 of FIG. 6 may be constructed as shown in FIG. 9. The purpose of this circuit, as stated previously, is to determine the difference between a particular estimated value ($\hat{Y}(i,l)$ and $\hat{C}(i,l)$) of the luminance and chrominance components of a given sample and the value of samples "near" the given sample. In this context, we have assumed that there are two nearby samples, the $(i-1,l)^{th}$ sample and the $(i,l-1)^{th}$ sample. In FIG. 9, the difference between $\hat{Y}(i,l)$ and the neighboring sample $Y(i,l-1)$ is formed in subtractor 901, and the difference between $\hat{Y}(i,l)$ and $\hat{Y}(i-1,l)$ is formed in a subtractor 902. Similarly, the difference between $\hat{C}(i,l)$ and its neighbors ($\hat{C}(i-2,l)$ and $C(i,l-1)$) are formed in a pair of subtractors 903 and 904, respectively. However, alternate samples of chrominance components are 180 degrees out of phase with each other, so that the $\hat{C}(i,l)$ value is first negated in inverters 906 and 907. The outputs of subtractors 901-904 are applied to a common adder circuit 905 which, in addition, receives an input $\hat{E}_J(i-1)$ from change storage circuit 611 and a negative input $E_{min}(i-1)$ from minimum change circuit 612. The output of adder 905 is the desired change value, normalized by the value $E_{min}(i-1)$, and is denominated $E_K(i)$ as shown in FIG. 6. This value is coupled back to both change circuit 612 and storage circuit 611.

In the example given above for L=2, change values $E_0$ to $E_7$ are calculated for each sample being processed. The Table below lists the values used in making these calculations.

| $E_K(i)$ | $E_K(i-1)$ | Y(i,l) | C(i,l) | Y(i-1,l) | C(i-2,l) |
|---|---|---|---|---|---|
| $E_0$ | $E_0(i-1)$ | $Y_V(i,l)$ | $C_V(i,l)$ | $Y_V(i-1,l)$ | $C_V(i-2,l)$ |
| $E_1$ | $E_0(i-1)$ | $Y_{H1}(i,l)$ | $C_{H1}(i,l)$ | $Y_V(i-1,l)$ | $C_V(i-2,l)$ |
| $E_2$ | $E_1(i-1)$ | $Y_V(i,l)$ | $C_V(i,l)$ | $Y_{H1}(i-1,l)$ | $C_V(i-2,l)$ |
| $E_3$ | $E_1(i-1)$ | $Y_{H2}(i,l)$ | $C_{H2}(i,l)$ | $Y_{H1}(i-1,l)$ | $C_V(i-2,l)$ |
| $E_4$ | $E_2(i-1)$ | $Y_V(i,l)$ | $C_V(i,l)$ | $Y_V(i-1,l)$ | $C_H(i-2,l)$ |
| $E_5$ | $E_2(i-1)$ | $Y_{H3}(i,l)$ | $C_{H3}(i,l)$ | $Y_V(i-)$ $C_H(i-2,l)$ | |
| $E_6$ | $E_3(i-1)$ | $Y_V(i,l)$ | $C_V(i,l)$ | $Y_{H2}(i-1,l)$ | $C_H(i-2,l)$ |
| $E_7$ | $E_3(i-1)$ | $Y_{H4}(i,l)$ | $C_{H4}(i,l)$ | $Y_{H2}(i-1,l)$ | $C_H(i-2,l)$ |

Figure 10:
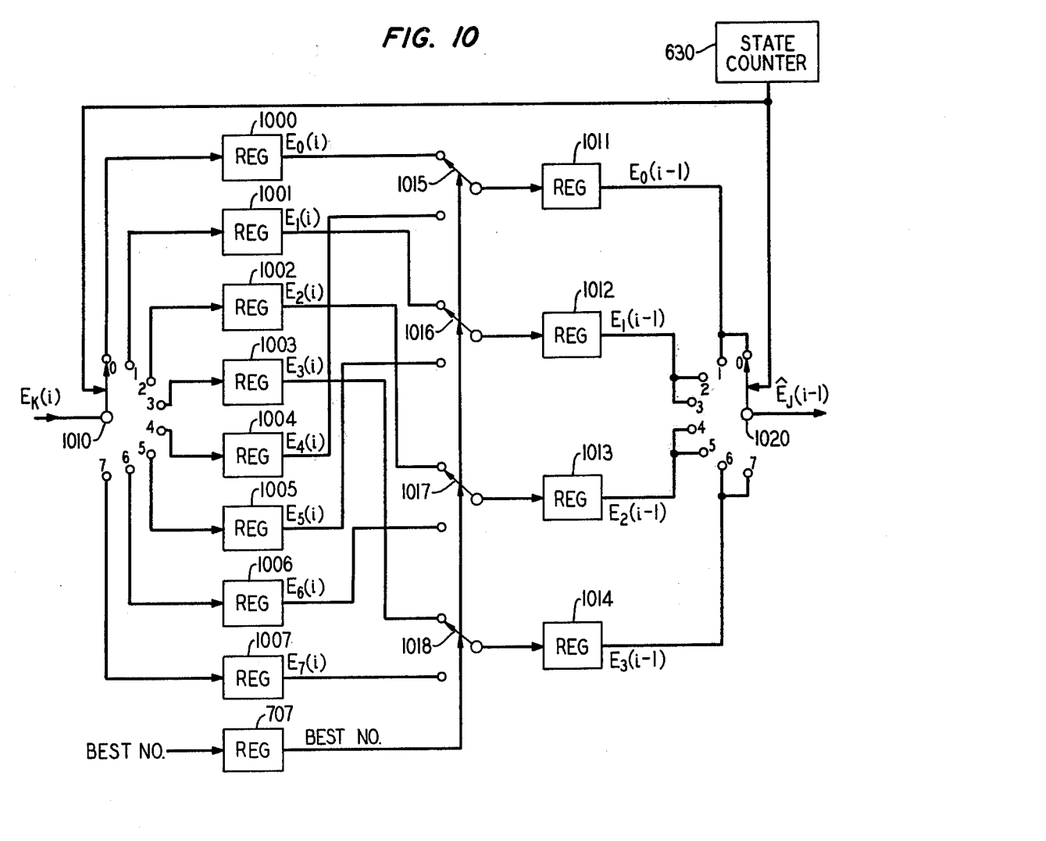
FIG. 10 is a block diagram of change storage circuit 611 of FIG. 6.

The change values calculated by the circuit of FIG. 9 must be stored for one sample interval so that a running total of previous changes can be accumulated by adding the present value $E_K(i)$ to the previous accumulated value $\acute{E}_j(i-1)$. This storage is accomplished by the change storage circuit of FIG. 10, which is shown assuming L=2. In this example, the values $E_0(i)$ through $E_7(i)$ are entered into resistors 1000 through 1007 by positioning switch 1010 in accordance with the state of state counter 630. During state 8, half of the stored change values are shifted to a second series of registers 1011–1014, depending on the positions of switches 1015–1018. These switches are controlled by the best number stored in register 707. The change values that are shifted correspond to the luminance values that are shifted from the first tier to the second tier of registers in the luminance store of FIG. 8; the other change values are discarded, since they correspond to luminance values that have been discarded. Finally, the retained change values are read out of registers 1011–1014 via switch 1020, which is controlled by all but the low order bit of state counter 630.

Figure 11:
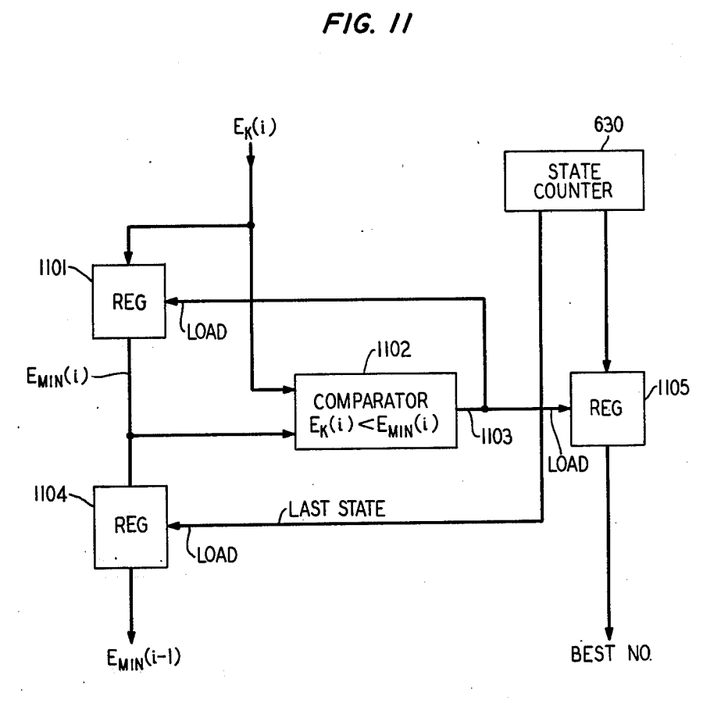
FIG. 11 is a block diagram of minimum change circuit 612 of FIG. 6.

Minimum change circuit 612 may be constructed as shown in FIG. 11. Generally, this circuit has two purposes: first, to determine which one of the error values $E_K(i)$ is the smallest, and second, to determine the "best number" signal associated with that minimum value. In FIG. 11, the change values $E_K(i)$ calculated by the circuit of FIG. 9 are applied to a store 1101 and to comparator 1102. The latter compares the present input $E_K(i)$ with the stored value denominated $E_{min}(i)$ in register 1101, to determine which is the smallest. If the present input is smaller than the stored value, that value of $E_K(i)$ becomes the new $E_{min}(i)$ by virtue of a load signal applied to register 1101 on lead 1103. Thus, the value stored in register 1101 is always the smallest one of the series $E_K(i)$ values applied to the circuit of FIG. 11. The value stored in register 1101 is transferred to an output store 1104 during the last state from state counter 630, so that the output of store 1104 is the desired value $E_{min}(i-1)$. Each time that comparator 1102 produces a load signal on line 1103, it also causes the output of state counter 630 to be applied to a best number register 1105. As a result, at the end of a sample interval, the number stored in register 1105 is the "best number" referred to previously.

As stated previously, the aforedescribed embodiment of the present invention incorporates certain design features for the purpose of illustration, and other arrangements may be made by those skilled in the art. For example, the definition of picture elements "near" the one being processed is not limited to the elements above and to the left of the present element; rather, other neighboring elements may be used, and different weights may be given to different elements if desired. Additionally, a decision need not be made between the horizontal and vertical filter estimates, but instead, the outputs of both filters may be combined subject to a weighting scheme in which the weights vary as a function of which estimate produces the smallest change relative to the values of its neighbors. Hysteresis may be added to the decision circuit described above, such that a transition from horizontal to vertical filter outputs (or vice-versa) cannot be made until a certain threshold is reached in the difference between the change signal computed for the component values with and without a transition.

What is claimed is:

1. Apparatus for separating each sample of a composite video signal into luminance and chrominance component values, comprising
    (a) means for forming a first estimate of said component values for a particular one of said samples, based upon the values of a first set of other ones of said samples,
    (b) means for forming a second estimate of said component values for said particular one of said samples, based upon the values of a second set of other ones of said samples, and
    (c) decision means for selecting either said first estimate or said second estimate, based upon the relationship between each of said estimated values and the values of previously separated samples.

2. The invention defined in claim 1 wherein each of said samples is associated with an element of a picture represented by said composite video signal,
    said first set of samples are associated with picture elements disposed vertically about the picture element associated with said particular sample, and
    said second set of samples is associated with picture elements disposed horizontally about the picture element associated with said particular sample.

3. The invention defined in claim 2 wherein said first and second forming means each includes a filter designed by fitting a polynomial to the sample values applied thereto.

4. The invention defined in claim 1 wherein said previously separated samples are associated with picture elements neighboring the picture element associated with said particular sample.

5. The invention defined in claim 4 wherein said decision means includes means for computing the differences between each of said estimated values and the sample values associated with said neighboring elements.

6. The invention defined in claim 1 wherein said apparatus further includes means for forming future estimates of the component values of at least one sample succeeding said particular sample, based upon each of said first and second estimated component values, and
    said decision means further includes means for evaluating the effect of each of said first and second estimates on said future estimates.

7. The invention defined in claim 6 wherein said apparatus further includes:
    (a) means for storing said first and second estimates and said future estimates.
    (b) means for sequentially forming the difference values between each of said future estimates and the sample values associated with picture elements neighboring said succeeding sample, (c) means for storing said difference values, and
(d) means for combining said stored difference values associated with all combinations of said first and second estimates and said future estimates.

8. Apparatus for separating each sample of a composite video signal into a luminance component value and a chrominance component value, each of said samples being associated with a particular element of a picture represented by said signal, each of said elements being located in a rectangular coordinate system wherein the presently processed sample is associated with the element in the $i^{th}$ sample position on the $l^{th}$ line, said apparatus comprising
    means for forming first estimates of the luminance and chrominance components of a first sample associated with the $(i,l)^{th}$ element, based upon the values of samples associated with other elements on the $l^{th}$ line,
    means for forming second estimates of the luminance and chrominance components of said first sample, based upon the values of sample associated with other elements in the $i^{th}$ sample position on neighboring and present lines,
    means for generating an error signal indicating the relationship between said first and second estimates and the component values of samples associated with picture elements neighboring said $(i,l)^{th}$ element, and
    means responsive to said error signal for seleting one of said estimates.

9. The invention defined in claim 8 wherein said neighboring picture elements are at the $(i-1)^{th}$ sample position on the $l^{th}$ line, and the $i^{th}$ sample position on the $(l-1)^{th}$ line.

10. The invention defined in claim 9 wherein said first and second forming means each include (a) a plurality of multipliers arranged to multiply said values of samples of said other elements by fixed coefficient values, and (b) means for algebraically combining the outputs of said multipliers.

11. Apparatus for determining the luminance component value $Y(i,l)$ and the chrominance component value $C(i,l)$ of a particular sample $X(i,l)$ of a color video signal, each sample of said signal being uniquely associated with an element in a picture represented by said signal, each of said elements being located in a rectangular coordinate system wherein l is the line and i is the position on the line of an element, said apparatus including
    (a) means for forming first estimates ($C_H(i,l)$ and $Y_H(i,l)$) of the component values of said particular sample, based upon sample values associated with elements on the $l^{th}$ line,
    (b) means for forming second estimates ($C_V(i,l)$ and $Y_V(i,l)$) of the component values of said particular sample, based upon sample values associated with elements in the $i^{th}$ sample position on previous and succeeding lines, and
    (c) decision means for selecting one of said estimates as the output of said apparatus, depending upon the value of samples associated with picture elements neighboring the picture element associated with said particular sample.

12. The invention defined in claim 11 wherein
(a) said first estimate forming means is arranged to compute $$Y_H(i,l) = (-\tfrac{1}{8})Y(i-2,l) - (\tfrac{1}{4})C(i-2,l) + Y(i-1,l) + (\tfrac{1}{2}) X (i,l) + (\tfrac{1}{8}) X (i+2,l), \text{ and}$$

$$C_H(i,l) = X(i,l) - Y_H(i,l), \text{ and}$$

(b) said second estimate forming means is arranged to compute $$Y_V(i,l) = (\tfrac{1}{4})Y(i,l-1) + (\tfrac{1}{4})C(i,l-1) + (\tfrac{1}{4}) X (i,l) + (\tfrac{1}{4}) X (i,l+1), \text{ and}$$

$$C_V(i,l) = X(i,l) - Y_V(i,l).$$

13. The invention defined in claim 12 wherein said decision means is arranged to compute first and second change signals $E_1$ and $E_2$, wherein $$E_1 = |Y_H(i,l) - Y(i-1,l)| + |Y_H(i,l) - Y(i,l-1)| + |C_H(i,l) - C(i-2,l)| + |C_H(i,l) - C(i,l-1)|$$

and $$E_2 = |Y_V(i,l) - Y(i-1,l)| + |Y_V(i,l) - Y(i,l-1)| + |C_V(i,l) - C(i-2,l)| + |C_V(i,l) - C(i,l-1)|$$
and wherein said decision means is arranged to select said first estimate or said second estimate, based upon the relative magnitude of $E_1$ and $E_2$.

14. Apparatus for generating an output signal representing the value of at least one of the luminance and chrominance components of a composite color video signal, comprising
    first and second filters responsive to said composite signal and said output signal of said apparatus for forming first and second estimates of the value of said at least one component,
    means for comparing each of said estimates to preceding ones of said estimates to select the estimate producing the smallest change, and
    means responsive to said comparing means for coupling said selected estimate to said output of said apparatus.

15. Apparatus for separating a color video signal which represents a picture into luminance and chrominance components, including
    means for spatially filtering said signal in first and second directions to form first and second estimates of said components for a particular element of said picture and
    means responsive to preceding component values for selecting one of said estimates.

16. The invention defined in claim 15 wherein said filtering means is arranged to apply all possible combinations of values of preceding components to said filter.

17. The invention defined in claim 15 wherein said selecting means is arranged to compute the difference between each of said estimates and preceding component values of picture elements near said particular element.

18. Apparatus for separating a composite color video signal into luminance and chrominance components comprising
    (a) means for storing previous outputs of said apparatus,
    (b) means responsive to said stored outputs and said composite signal for forming at least first and second estimates of said components, said forming means including a first filter responsive to a first set of stored outputs and a second filter responsive to a second set of stored outputs,
    (c) means for comparing said first and second estimates with preselected ones of said previous outputs to select the one of said estimates producing the smallest change, and
    (d) means responsive to said comparing means for coupling said selected estimate to said storage means.

* * * * *

UNITED STATES PATENT AND TRADEMARK OFFICE
CERTIFICATE OF CORRECTION

PATENT NO. : 4,141,035

DATED : February 20, 1979

INVENTOR(S) : Nicholas F. Maxemchuk and Dhiraj K. Sharma

It is certified that error appears in the above-identified patent and that said Letters Patent are hereby corrected as shown below:

Column 4, line 46, that portion of the formula reading "$Y_H(i-\ell) = $" should read --$Y_H(i,\ell) = -\frac{3}{8} \; -\frac{1}{8} \; 1 \; \frac{1}{4} \; \frac{1}{8}$--.

Column 6, line 36, "$Y(i-1,\ell)$" should read --$Y(i-L,\ell)$--.

Column 11, lines 6-14, that portion of the table reading

| $Y(i-1,\ell)$ | $C(i-2,\ell)$ |
|---|---|
| $Y_V(i-1,\ell)$ | $C_V(i-2,\ell)$ |
| $Y_V(i-1,\ell)$ | $C_V(i-2,\ell)$ |
| $Y_{H1}(i-1,\ell)$ | $C_V(i-2,\ell)$ |
| $Y_{H1}(i-1,\ell)$ | $C_V(i-2,\ell)$ |
| $Y_V(i-1,\ell)$ | $C_H(i-2,\ell)$ |
| $Y_V(i-)$ | |
| $C_H(i-2,\ell)$ | |
| $Y_{H2}(i-1,\ell)$ | $C_H(i-2,\ell)$ |
| $Y_{H2}(i-1,\ell)$ | $C_H(i-2,\ell)$ | should read

| $Y(i-1,\ell)$ | $C(i-2,\ell)$ |
|---|---|
| $Y_V(i-1,\ell)$ | $C_V(i-2,\ell)$ |
| $Y_V(i-1,\ell)$ | $C_V(i-2,\ell)$ |
| $Y_{H1}(i-1,\ell)$ | $C_V(i-2,\ell)$ |
| $Y_{H1}(i-1,\ell)$ | $C_V(i-2,\ell)$ |
| $Y_V(i-1,\ell)$ | $C_H(i-2,\ell)$ |
| $Y_V(i-1,\ell)$ | $C_H(i-2,\ell)$ |
| $Y_{H2}(i-1,\ell)$ | $C_H(i-2,\ell)$ |
| $Y_{H2}(i-1,\ell)$ | $C_H(i-2,\ell)$ |

Column 12, line 34, "associted" should read --associated--.

Column 13, line 20, "sample" should read --samples;

UNITED STATES PATENT AND TRADEMARK OFFICE
CERTIFICATE OF CORRECTION

PATENT NO. : 4,141,035
DATED : February 20, 1979
INVENTOR(S) : Nicholas F. Maxemchuk and Dhiraj K. Sharma It is certified that error appears in the above—identified patent and that said Letters Patent is hereby corrected as shown below:

Column 13, line 28, "seleting" should read -- selecting --.

Signed and Sealed this

Twenty-seventh Day of May 1980

[SEAL]

Attest:

SIDNEY A. DIAMOND

Attesting Officer     Commissioner of Patents and Trademarks